United States Patent [19]
Holland-Letz

[11] 3,960,304
[45] June 1, 1976

[54] DEVICE FOR HOLDING DOWN SHEET MATERIAL

[75] Inventor: Güenter Holland-Letz, Paderborn-Wewer, Germany

[73] Assignee: Nixdorf Computer AG, Paderborn, Germany

[22] Filed: Apr. 23, 1975

[21] Appl. No.: 570,771

[30] Foreign Application Priority Data

Apr. 23, 1974 Germany ............................ 2419571

[52] U.S. Cl. ........................................ 226/74; 226/83
[51] Int. Cl.² ............................................ G03B 1/30
[58] Field of Search .................... 226/74, 75, 59, 82, 226/83

[56] References Cited

UNITED STATES PATENTS

| | | | |
|---|---|---|---|
| 2,622,476 | 12/1952 | Ress | 226/83 X |
| 3,114,490 | 12/1963 | Zenner | 226/74 |

*Primary Examiner*—Richard A. Schacher
*Attorney, Agent, or Firm*—Gifford, Chandler & Sheridan

[57] ABSTRACT

A device for holding down sheet material on a conveyor belt, the device having a spring-loaded flap which can be locked in the holding down position and which when the lock is released, is moved into an open position by the spring pull and is thus swivelled about a shaft which is arranged parallel to the direction in which the conveyor belt moves.

7 Claims, 4 Drawing Figures

DEVICE FOR HOLDING DOWN SHEET MATERIAL

BACKGROUND OF THE INVENTION

I. Field of the Invention

The invention relates to a device for holding down sheet material on a conveyor belt.

II. Description of the Prior Art

Prior known devices of this type are employed, for example, for form feeds in accounting machines, and also in other feed devices and in copying machines. The device serves to hold the sheet material usually paper, on the conveyor belt in such a way that a perfect friction contact is set up between the sheet material and the conveyor belt and mis-feeds cannot occur.

A particular case of application is with the so-called Leporello feeds, which operate using a pin feed as the conveyor belt. In this case, the sheets to be conveyed are provided with a perforation in which pin elements of the conveyor belt engage. A holding-down device is particularly important here in order to achieve trouble-free operation and an accurate mode of action with a low feed noise level when the feed rate is high.

Prior known devices have been somewhat complex and have taken up a relatively large amount of space alongside the conveyor belt. Special lever and adjusting elements have been provided in order to make manual adjustment of the spring-loaded flap possible. In many cases it is required to feed several sheets alongside one another in a machine when, for example, multiple-copy sets are to be processed in accounting machines. It is particularly important in these circumstances that the feed devices should not require too much space.

We have now devised an improved holding down device which is simple in operation and construction and which can be made in relatively compact form.

SUMMARY OF THE INVENTION

According to the invention, there is provided a device for holding down sheet material on a conveyor, which device comprises a pivotally mounted flap member which is spring-biased to move from a holding down position towards an open position, and a locking device for locking the flap in the holding down position, the locking device comprising a locking arm mounted on a shaft, the arm being pivotable between a locking position in which it engages over a part of the flap to lock it in the holding down position, and an unlocked position in which the flap is free to move to its open position, the pivotal axis of the flap being perpendicular to the axis of the shaft.

The invention also includes apparatus comprising a conveyor belt and a device of the invention, the pivotal axis of the flap being close to the conveyor belt and parallel to the direction of movement of the conveyor belt.

With this simple arrangement of the devices of the invention, it is possible for the devices to take up no more space laterally alongside the feed, than is in any case required for the mounting of a feed frame.

The pivotal axis of the flap can suitably be arranged in the plane of the mounting frame. The spring-biasing of the flap can suitably be effected by one or more torsion springs, and these need not give rise to any additional space requirements which extend substantially above the plane of the feed frame. The same also applies to the shaft mounting the locking arm which shaft can suitably be arranged in a common plane with the pivotal axis of the flap. In the locking position, the holdingdown arm engages over part of the flap and it need not project laterally beyond the feed frame. To release the lock, it is sufficient to swivel the shaft through 90° in order to be able to open the flap fully. In this position, also, no element of the device need project beyond the lateral plane of the feed frame.

The shaft is preferably biased by a spring, e.g. a torsion spring, to move the locking arm into the locking position. In this way the arm is automatically moved into its locking position when the flap is pressed down manually. If the spring provided for the shaft is a torsion spring a very simple construction results, since the torsion spring can be arranged around the shaft and does not take up any additional space in the lateral direction.

In a further advantageous embodiment, a portion of the flap member over which the locking arm moves between its locked and unlocked positions, is so shaped as to bias the locking arm towards its unlocked position when that portion of the flap member is biased against the locking arm. Preferably, the force of the spring biasing the flap and the force of the spring biasing the shaft are so arranged that the locking arm is moved into the unlocked position when it is engaged by the portion of the flap member.

With this arrangement, once the locking arm is moved from the locking position to be over the portion of the flap, it is then auomatically moved to the unlocked position by snap action.

DESCRIPTION OF THE DRAWINGS

In order that the invention may be more fully understood, an embodiment thereof will now be described by way of example only, with reference to the accompanying drawings, in which.

DESCRIPTION of A PREFERRED EMBODIMENT

Figure 1:
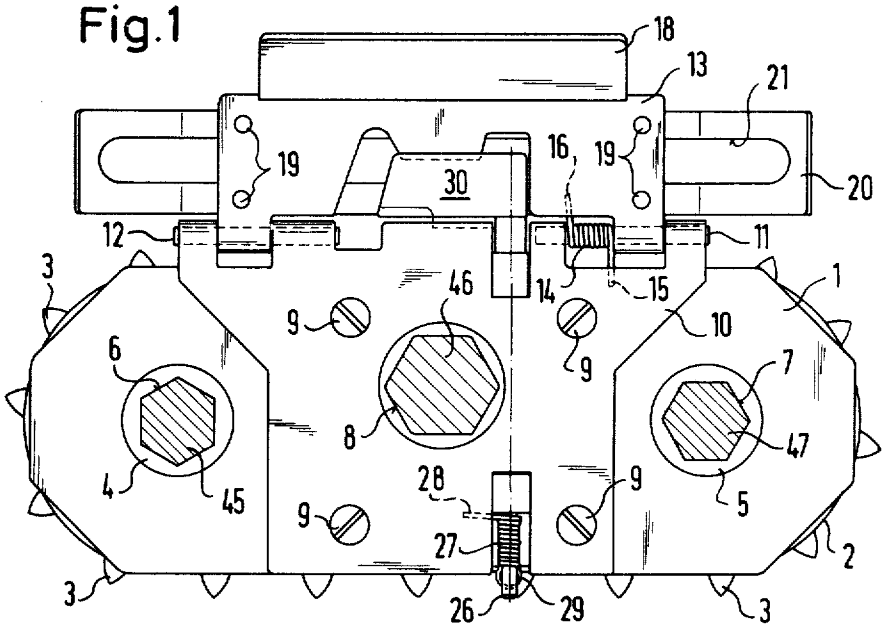
FIG. 1 is a side view of a holding-down device of the invention on a Leporello feed with pin feeds.

FIG. 1 shows a feed frame 1, which guides a pin feed 2, which is provided with pin elements 3, between two lateral plates. The pin feed 2 is guided on drive rollers 4 and 5, which are provided in the center with hexagonal cutouts 6 and 7, in which drive shafts 45 and 47 can be arranged. The pin feed 2 serves to feed perforated sheet material, which is not shown in FIG. 1.

The side plate 1, which can be seen in FIG. 1, has in the center a hexagonal cutout 8, at which the entire feed frame can be slipped onto a guide shaft 46. The feed device can thus be moved at right angles to the plane of projection on the drive shafts and the guide shaft. The small space requirements of the holding-down device are particularly important here when further feed devices for multiple-copy sets are provided.

Figure 2:
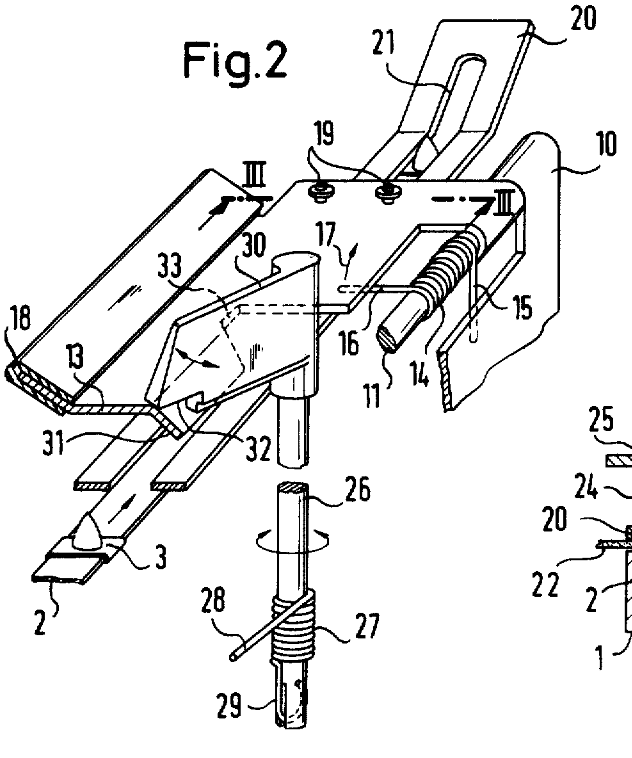
FIG. 2 is a perspective representation of the device, some parts being shown separately.

A support plate 10, which serves for mounting the holding down device, is fixed to the feed frame 1 by means of screws 9. The upper edge of this support plate 10 is bent round in a hinge-like manner and serves for mounting two rods 11 and 12, on which a holding-down flap 13 is pivotally mounted. A torsion spring 14 acts on this flap 13, the torsion spring being arranged on the rod 11, the arm 15 of the spring resting against the mounting plate 10 and the arm 16 of the spring acting on the holding-down plate 13 in such a way that this is moved by the torsion spring 14 into the vertical opening position shown in FIG. 1. This movement is shown in FIG. 2 by the arrow 17.

The holding-down flap 13 is provided, on the edge which faces away from the hinge, with a plastic edge 18 which serve as a grip edge and makes manual operation of the flap 13 possible.

It can also be seen in FIG. 1, that, for the particular case of use in combination with a pin feed 2, a guide or pressing element 20 is fastened by bolts 19 to the holding-down flap 13. This guide element 20 is a supporting surface which is provided with a longitudinal slit 21, through which the pin elements 3 of the pin feed 2 are guided. As will be described this guide element 20 is spring-pressed onto the pin feed 2.

It can also be seen from FIG. 1 that a vertical torsion bar or shaft 26, which holds a torsion spring 27 at its lower end, is arranged in the plane of the rods 11 and 12. The end 29 of the torsion spring is anchored to the torsion bar 26 and the upper end 28 of the spring lies against the mounting plate 10, so that the torsion bar presses a locking or holding-down arm 30, which is fastened to its upper end, against the holding-down flap 13.

These relationships can be better seen in FIG. 2, which is a perspective representation of the holding-down device. The holding-down flap 13 is shown in its horizontal holding-down position and the holding-down arm 30 is in an intermediate position between the locking position and the lock release position. It can be seen that the holding-down flap 13 is provided with an edge 31 which is bent obliquely and which influences the holding-down arm 30 in the position shown in FIG. 2 when the holding-down flap 13 is swivelled up in such a way that it passes into its opening position or lock-release position without manual action. If, on the other hand, the holding-down flap 13 is pressed down into the position shown in FIG. 2, the holding-down arm 30 automatically snaps, through the force of its torsion spring 27, into a position which is transverse to the direction in which the pin feed 2 moves. For this purpose, a special cutout 33 is provided in the holding-down flap 13, the holding-down arm 30 then being able to latch into the cutout in such a way that the front edge of the arm sits on the holding-down flap 13. The front lower edge of the holding-down arm is provided with a cutout 32, which makes it possible to engage in the cutout 33 after moving beyond the bent edge 31.

It can also be seen from FIG. 2 that the pin elements 3 of the pin feed 2 are guided through the longitudinal slit 21 of the pressing element 20. This pressing element is held on pins 19, which sit in corresponding bores in the holding-down flap 13.

Figure 3:
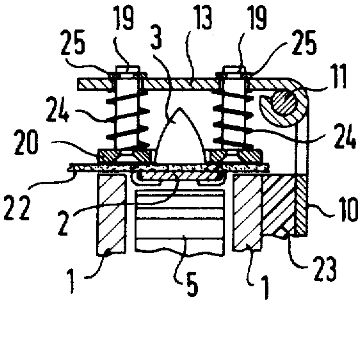
FIG. 3 is a section on line III—III of FIG. 2.

FIG. 3 shows the construction of the mounting of the pressing element 20 on the holding-down flap 13 and the coordination of the holding-down device with the frame 1 of the feed device. The drive roller 5 for the pin feed 2 is also shown in FIG. 3. It can be seen that the pressing element 20 is held on pins, the lower ends of which are screwed to the pressing element, while the upper ends are guided through bores in the holding-down flap 13 and are secured by securing rings 25 in such a way that pressure springs 24 hold the pressing element 20 in the unstressed state at a maximum distance from the holding-down flap 13. When this flap 13 is in its holding-down position, the pressing element 20 rests on the pin feed and presses a form 22, which is to be fed, securely onto the pin feed 2.

It is further pointed out that the pin feed of the device shown in FIGS. 1 to 3 is guided between the two side flaps 1 of the frame on the drive rollers 4 and 5, but between the two rollers passes over a gusset which is not shown in the figures and which forms an end support to the guide element 20, which is pressed onto the pin feed.

Figure 4:
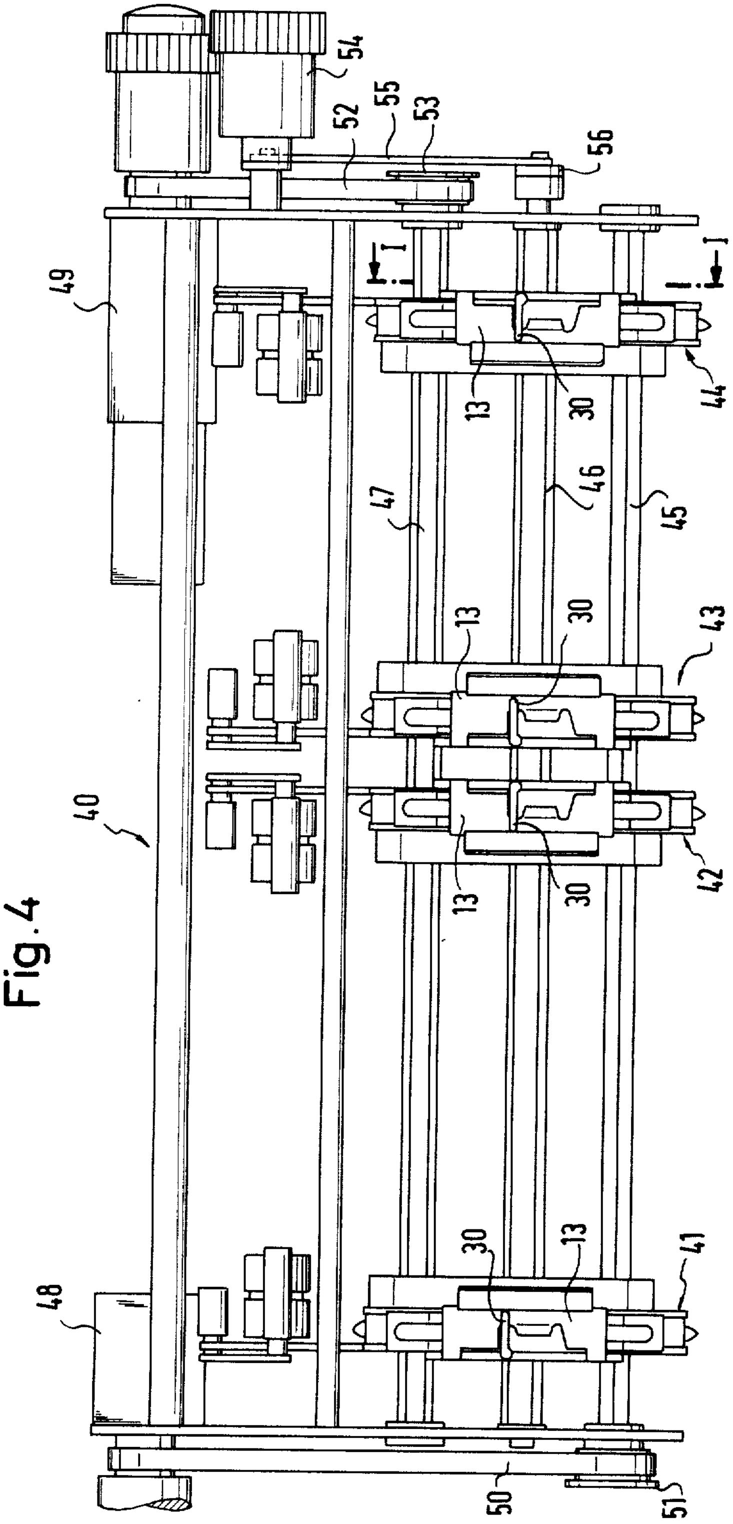
FIG. 4 is a plan view of a feed system of an accounting machine, in which devices according to the invention are fitted.

FIG. 4 shows the possibilities for use of a device according to the invention in the recording mechanism of an accounting machine. The feed device 40 of this accounting machine is shown in a plan view and essentially forms a frame in which the drive shafts 45 and 47 for the feed rollers and a guide shaft 46 are arranged parallel to one another. Several devices 41, 42, 43 and 44, which in each case belong to a Leporello pin feed, are mounted in a movable manner on the guide shaft 46 and on the drive shafts 45 and 47. These feed devices can be moved in a lateral direction on the shafts 45 and 47 shown and on the guide shaft 46. The shafts 45 and 47 are driven separately by drive devices 48 and 49, which, on the one hand, act on the shaft 45 via a drive belt 50 and a drive roller 51 and, on the other hand, act on the shaft 47 via a drive belt 52 and a drive roller 53. The guide shaft 46 is provided on its right-hand end with a lock-release device, which consists of a handle 54, a lever 55 and an eccentric 56. By means of this lock-release device, the guide shaft 46 can be rotated in such a way that the feed devices 41, 42, 43 and 44 pass from a fixed position into a loosened position in which they can be moved towards one another.

It can be particularly clearly seen from FIG. 4 that a holding-down device according to the invention due to its narrow design has no parts which project laterally beyond the particular feed and it is thus possible to arrange the individual feed devices 41, 42, 43 and 44 directly adjacent to one another. This is particularly important when the four feed devices shown are to be used to feed two sets of forms alongside one another, which then practically take up the entire width of the recording mechanism. The narrow construction of a device' according to the invention is then particularly advantageous for the two central feed devices 42 and 43, which can be fixed directly to one another, adjacent to their guides.

I claim:

1. A device for holding down sheet material on a conveyor, which device comprises a pivotally mounted flap member which is spring-biased to move from a holding down position towards an open position, and a locking device for locking the flap in the holding down position, the locking device comprising a locking arm mounted on a shaft, the arm being pivotable between a locking position in which it engages over a part of the flap to lock it in the holding down position, and an unlocked position in which the flap is free to move to its open position, the pivotal axis of the flap being perpendicular to the axis of the shaft.

2. A device according to claim 1, wherein the shaft is biased to move the locking arm into the locking position.

3. A device according to claim 2, wherein the shaft is biased by a torsion spring.

4. A device according to claim 2 wherein a portion of the flap member over which the locking arm moves between its locked and unlocked positions, is so shaped as to bias the locking arm towards its unlocked position when the said portion of the flap member is biased against the locking arm.

5. A device according to claim 3 wherein the force of the spring biasing the flap and the force of the spring biasing the shaft are so arranged that the locking arm is moved into the unlocked position when it is engaged by the said portion of the flap member.

6. A device according to claim 1, wherein the flap member is pivotally mounted on two coaxial rods spaced longitudinally, and the said shaft is mounted between the said rods.

7. Apparatus comprising a conveyor belt and a device for holding down sheet material on the conveyor belt, and said device comprising a pivotally mounted flap member which is spring-biased to move from a holding down position towards an open position, and a locking device for locking the flap in the holding down position, the locking device comprising a locking arm mounted on a shaft, the arm being pivotable between a locking position in which it engages over a part of the flap to lock it in the holding down position, and an unlocked position in which the flap is free to move to its open position, the pivotal axis of the flap being perpendicular to the axis of the shaft, wherein the pivotal axis of the flap is close to the conveyor belt and parallel to the direction of movement of the conveyor belt.

* * * * *